(12) United States Patent
Brown

(10) Patent No.: US 6,519,916 B1
(45) Date of Patent: Feb. 18, 2003

(54) SYSTEM AND METHOD FOR CONVEYING AIR-FILLED PACKING CUSHIONS

(75) Inventor: Kurt E. Brown, New London, PA (US)

(73) Assignee: Free-Flow Packaging International, Inc., Redwood City, CA (US)

( * ) Notice: Subject to any disclaimer, the term of this patent is extended or adjusted under 35 U.S.C. 154(b) by 0 days.

(21) Appl. No.: 09/217,876

(22) Filed: Dec. 21, 1998

(51) Int. Cl.[7] .............................................. B65B 31/00
(52) U.S. Cl. ................. 53/403; 53/79; 53/250
(58) Field of Search ...................... 53/403, 406, 79, 53/250; 156/145, 147

(56) References Cited

U.S. PATENT DOCUMENTS

| | | |
|---|---|---|
| 3,705,676 A | 12/1972 | Overly et al. |
| 3,708,208 A | 1/1973 | Fuss |
| 3,762,772 A | 10/1973 | Fuss |
| 4,049,854 A * | 9/1977 | Casey et al. ................. 156/147 |
| 4,600,065 A * | 7/1986 | Morris ......................... 53/250 |
| 4,744,702 A * | 5/1988 | Wiseman et al. |
| 4,799,830 A | 1/1989 | Fuss |
| 5,209,387 A * | 5/1993 | Long et al. |
| 5,419,457 A * | 5/1995 | Ross et al. ..................... 53/250 |
| 5,552,003 A * | 9/1996 | Hoover et al. ............... 156/147 |
| 5,581,983 A * | 12/1996 | Murakami ..................... 53/79 |
| 5,693,163 A * | 12/1997 | Hoover et al. ............... 156/147 |
| 5,873,215 A * | 2/1999 | Aquarius et al. ............. 53/403 |
| 5,938,877 A * | 8/1999 | Schram ........................ 53/403 |
| 5,942,076 A * | 8/1999 | Salerno et al. .............. 156/147 |

FOREIGN PATENT DOCUMENTS

| | | |
|---|---|---|
| DE | 2509469 | 9/1976 |
| FR | 2358345 | 2/1978 |
| GB | 951554 | 3/1964 |
| GB | 1102293 | 2/1968 |
| WO | 98 40276 | 9/1998 |

OTHER PUBLICATIONS

Airfil 1200 Packaging System, 1996.*
AirFil brochure, amasec services, mid 1998.*

* cited by examiner

Primary Examiner—Eugene Kim
(74) Attorney, Agent, or Firm—Edward S. Wright

(57) ABSTRACT

System and method for conveying air-filled cushions in which a continuous string of the cushions is fed into an elongated duct with the string extending longitudinally of the duct, and an air flow is established in the duct to convey the string of cushions through the duct to a bin. In some embodiments, the bin is mounted on wheels to facilitate movement between different locations, and in others, it is suspended from a trolley which runs on an overhead track.

24 Claims, 6 Drawing Sheets

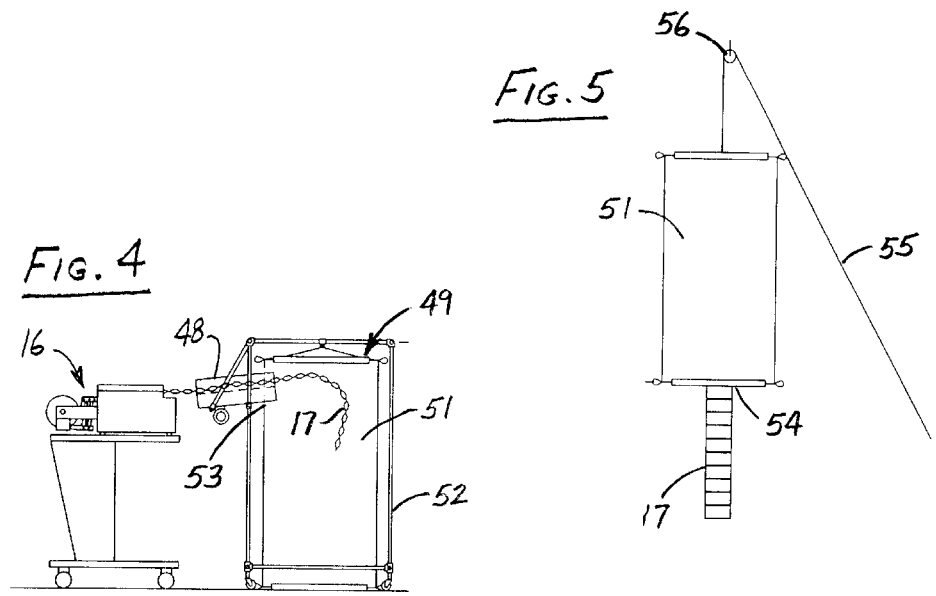
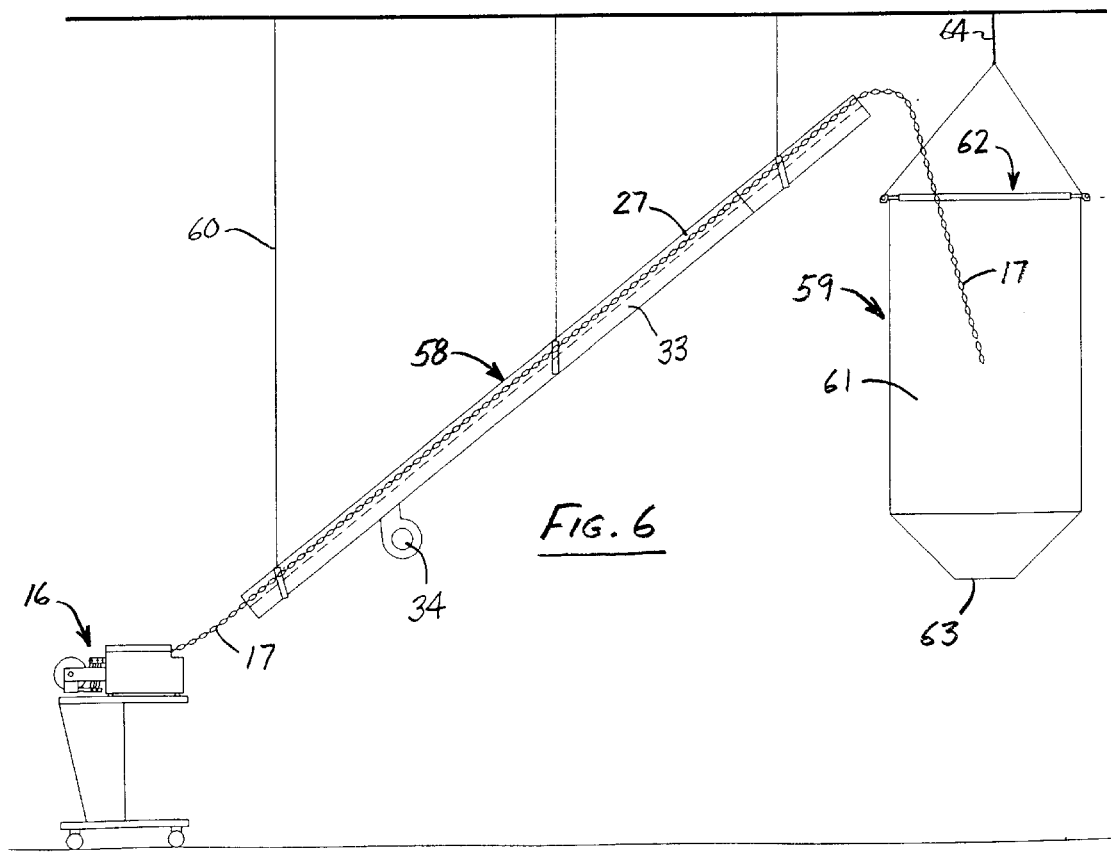

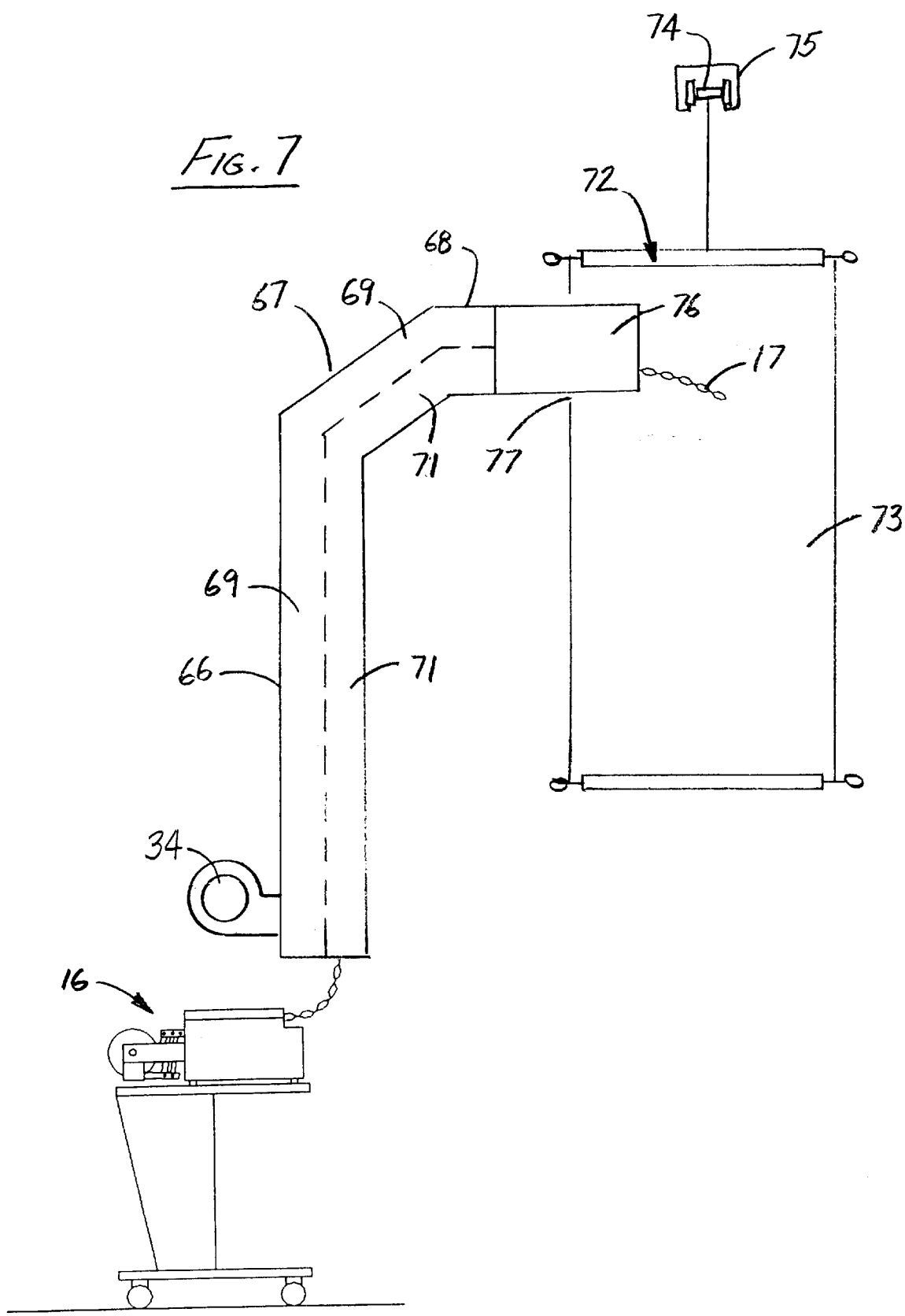

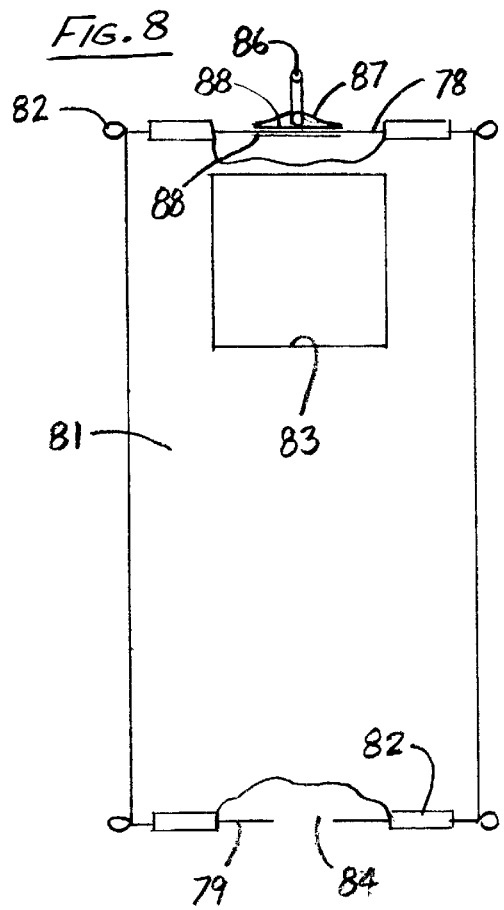
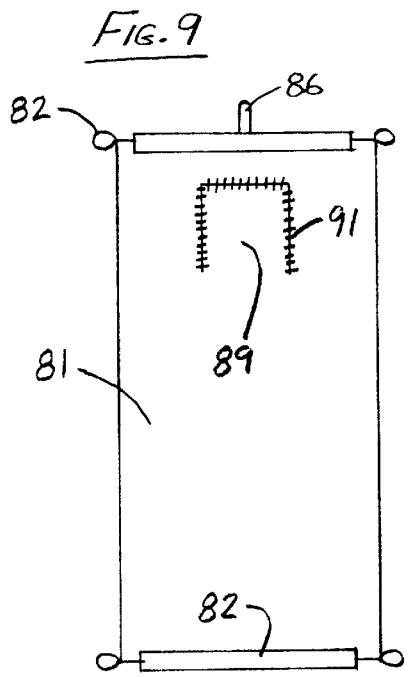
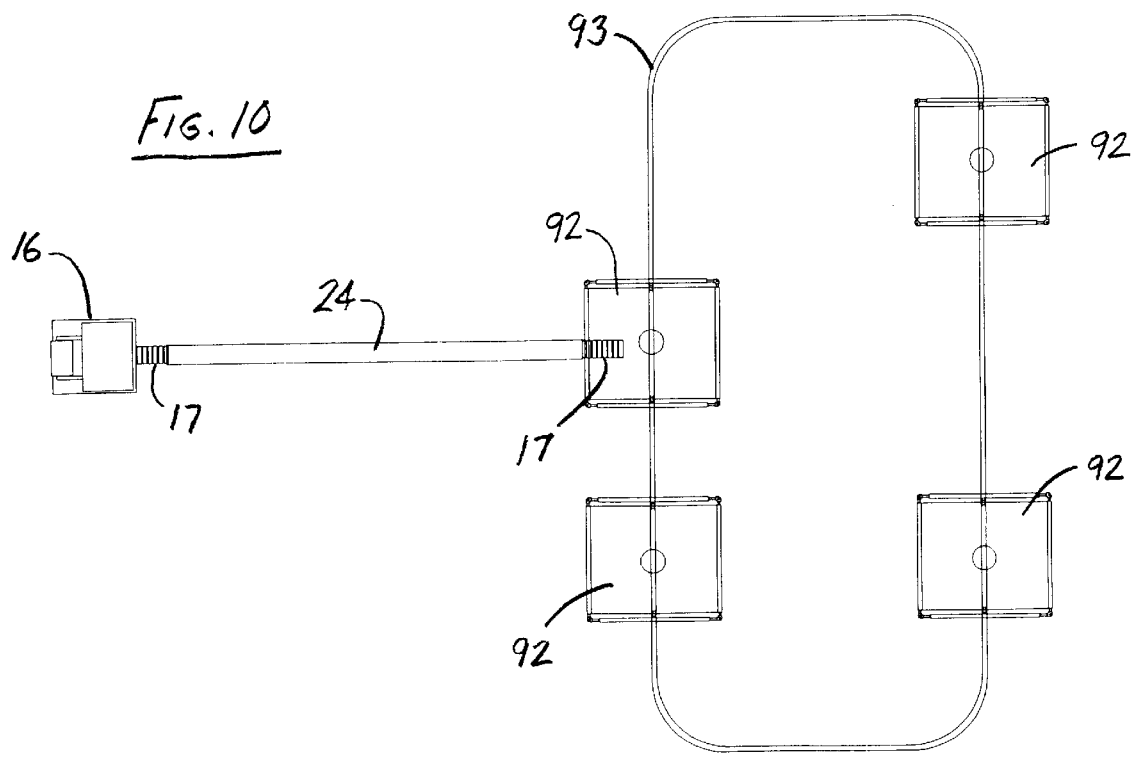

SYSTEM AND METHOD FOR CONVEYING AIR-FILLED PACKING CUSHIONS

This invention pertains generally to packing materials and, more particularly, to a system and method for conveying air-filled packing cushions between a machine in which they are made them and a location where they are used.

Small air-filled cushions or pillows are used as a protective filling material in packing fragile items and other objects in shipping cartons and the like. One particularly preferred machine for making such cushions is disclosed in copending Ser. No. 08/905,692, U.S. Pat. No. 5,873,715. The cushions exit that machine in the form of a continuous string or stream of cushions, with perforations between the cushions permitting them to be torn apart individually or in groups, as desired.

A problem with any packing material is transporting it from the location where it is made to the location where it is to be used. With air-filled cushions, the problem is somewhat unique in that no apparatus has heretofore been provided for conveying such materials.

It is in general an object of the invention to provide a new and improved system and method for conveying air-filled packing cushions.

Another object of the invention is to provide a system and method of the above character which is particularly suitable for use in conveying the air-filled cushions between a machine in which they are made and a location in which they are used.

These and other objects are achieved in accordance with the invention by providing a system and method in which a continuous string of air-filled cushions is fed into an elongated duct with the string extending longitudinally of the duct, and an air flow is established in the duct to convey the string of cushions through the duct to a bin. In some embodiments, the bin is mounted on wheels to facilitate movement between different locations, and in others, it is suspended from a trolley which runs on an overhead track.

FIG. 4 is a side elevational view of another embodiment of a system for providing air-filled packing cushions in accordance with the invention.

FIG. 5 is an operational view showing the bin in the embodiment of FIG. 4 in an elevated position for dispensing the air-filled packing cushions.

FIGS. 6 and 7 are side elevational views of additional embodiments of a system for providing air-filled packing cushions in accordance with the invention.

FIGS. 8 and 9 are side elevational views, partly broken away of containers for use in the embodiment of FIGS. 4 and 7.

FIGS. 10–12 are top plan views of three embodiments of a system for manufacturing, conveying and dispensing air-filled packing cushions in accordance with the invention.

Figure 1:
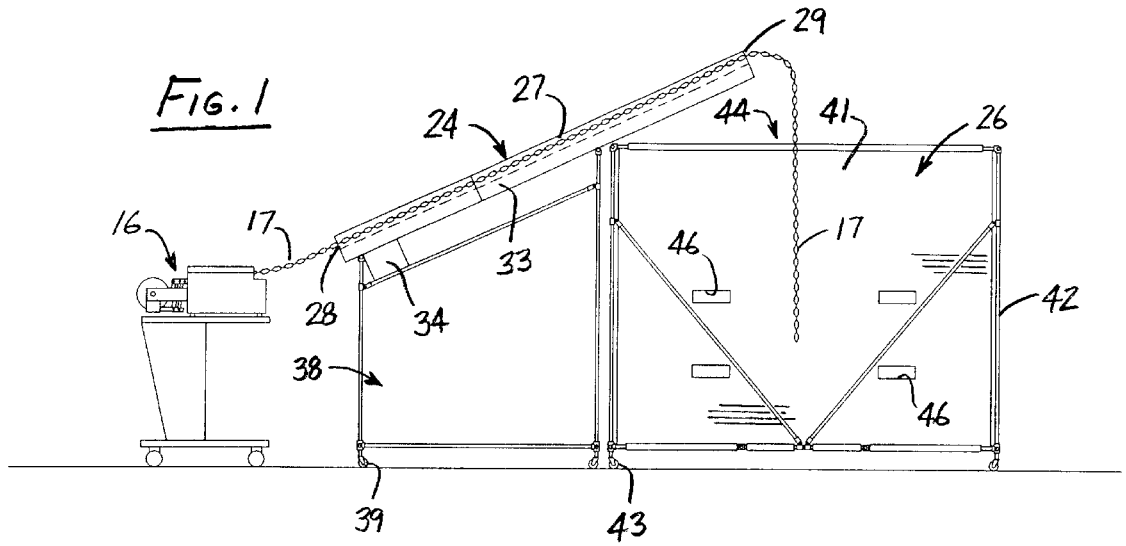
FIG. 1 is a side elevational view of one embodiment of a system for providing air-filled packing cushions in accordance with the invention.
Figure 2:
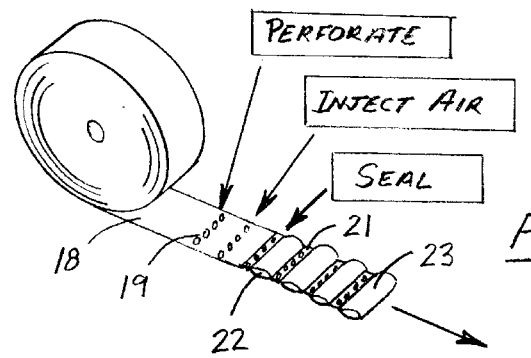
FIG. 2 is a schematic view illustrating the operation of a preferred machine for manufacturing air-filled packing cushions in the embodiment of FIG. 1.
Figure 3:
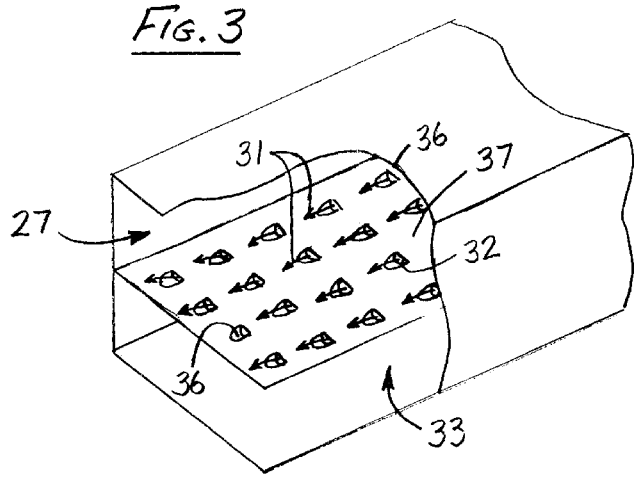
FIG. 3 is a fragmentary isometric view of the conveyor for the air-filled packing cushions in the embodiment of FIG. 1.

As illustrated in FIG. 1, the system includes a machine 16 for making a continuous string or stream of air-filled packing cushions 17. A particularly preferred machine for this purpose is described and illustrated in copending Ser. No. 08/905,692, U.S. Pat. No. 5,873,215, the disclosure of which is incorporated by reference. That machine manufactures the cushions from a length of flattened flexible tubing 18 by perforating the tubing to form transverse rows of openings 19 which extend across the tubing at longitudinally spaced intervals, injecting air into the tubing through the openings, and sealing the tubing together along transversely extending lines 21 to seal the openings and form chambers 22 in which the air is confined. The cushions 23 thus formed balloon or billow outwardly from the seal lines, and the perforations between the cushions permit the cushions to be torn apart for use individually or in groups, as desired.

A conveyor 24 delivers the string of cushions produced by the machine to a bin 26 for use at a packing station. The conveyor is of a type which has heretofore been used in conveying fluent materials such as grain and loose fill packing materials. One example of such a conveyor is found in U.S. Pat. No. 4,799,830, the disclosure of which is incorporated herein by reference.

The conveyor includes an elongated duct 27 which has an inlet end 28 positioned adjacent to the machine which makes the cushions and an outlet end 29 positioned above the bin. The string of cushions is fed into and conveyed through the duct in a longitudinal direction, with the seal lines between successive cushions extending transversely of the duct. In the embodiment of FIG. 1, the duct is inclined upwardly at an angle on the order of 30 degrees.

The string of cushions is propelled through the duct by an air flow created by directing jets of air 31 into the duct through directional openings 32 from a plenum chamber 33. The plenum chamber is positioned on the under side of the duct, and is coextensive in length with the duct. It is closed at the ends, and a blower 34 directs air into the chamber to produce a pressure greater than atmospheric pressure within the chamber. Since this pressure is higher than the pressure within the duct, air tends to flow from the plenum chamber, through openings 32 and into the duct. The openings have louvers 36 which direct the air flow in a forward direction, i.e. from the inlet end of the duct toward the outlet end. Somewhat surprisingly, this flow of air has been found to be quite effective in conveying the string of cushions through the duct.

In the embodiment illustrated, louvered openings 32 are formed in a common wall 37 between the plenum chamber and the duct by means of half-round dies which make generally semicircular cuts in the wall and then bend the resulting tabs down into a scoop shape to form the opening and the louvers.

The conveyor is illustrated as being mounted on and supported by a framework 38 which includes wheels 39 that facilitate positioning of the conveyor. It can, however, be supported by any suitable means.

Bin 26 comprises a relatively large, generally rectangular storage bag 41 which is mounted on a framework 42 with wheels 43 to facilitate movement from one location to another. The bag is fabricated of a flexible material such as a plastic mesh, with an open top 44 through which the string of cushions is introduced by the conveyor. Openings 46 are formed in one or more of the side walls of the bag for removal of the cushions at a packing station. These openings are large enough to permit a hand to reach into the bag and pull out a group of cushions which can then be torn away from the rest of the string. The loose ends of the string can then be stuffed back into the bag or left dangling for future use.

In the embodiment of FIG. 4, the system includes a cushion making machine 16, a conveyor 48, and a bin 49. The conveyor is similar to conveyor 24, although somewhat shorter in length, and like reference numerals designate corresponding elements in the two embodiments. Bin 49 comprises a generally rectangular storage bag 51 which is removably mounted on a framework 52. This bag is approximately twice as tall as it is wide, and is closed on all six sides. It has an inlet opening 53 in one side wall through which the string of cushions is introduced, and an outlet opening 54 in the bottom wall through which the cushions are removed.

The conveyor is mounted on the same frame as the bag, and the outlet portion of the conveyor extends into the bag through opening 53. The conveyor is inclined upwardly, and the plenum chamber is positioned beneath the duct as in the embodiment of FIG. 1.

As illustrated in FIG. 5, bag 51 can be removed from framework 53 and hoisted to an elevated position above a packing station, with the string of cushions 17 being drawn through the outlet opening in the bottom of the bag. The bag is illustrated as being suspended from overhead by a line 55 trained over a pulley 56, but it can be supported by any suitable means.

The embodiment of FIG. 6 includes a cushion making machine 16, a conveyor 58, and a bin 59. Conveyor 58 is similar to conveyor 24, but is suspended from above by cables 60, rather than being mounted on a floor stand. Bin 59 includes a bag 61 in the form of a hopper having an open top 62 and an outlet opening 63 at the bottom. The conveyor is inclined at an angle on the order of 30 degrees, with the outlet end of the duct positioned above the bag and the string of cushions 17 being delivered into the bag through the open top. The bag is suspended from above by a cable 64.

In the embodiment of FIG. 7, the conveyor has a vertically extending section 66, an inclined section 67 at the upper end of the vertically extending section, and a short horizontally extending section 68 at the upper end of the inclined section. In the vertically extending section, the plenum chamber 69 is positioned on the side of the duct 71 closest to the cushion making machine 16, and in the inclined section and in the horizontally extending section, the plenum chamber is positioned above the duct. Introducing the air above the string of cushions in those two sections tends to direct the string in a downward direction as it emerges from the outlet end of the conveyor. If desired, a conveyor of this type can be utilized instead of an inclined conveyor in other embodiments such as the embodiment of FIG. 6.

The conveyor delivers the string of cushions to a bin 72 which consists of a bag 73 suspended from a trolley 74 that runs on an overhead track 75. A sleeve or chute 76 is mounted on the outer end of the horizontally extending section of the conveyor and extends into the bag through an opening 77 in one of the side walls. The chute is fabricated of a flexible plastic material to prevent the bag from being torn and the conveyor from being dislodged from its position when the bag is brought up to or removed from the conveyor. The air flow from the conveyor keeps the chute in a distended condition while the conveyor is running. Alternatively, the bag can be suspended from cables connected to a fixed structure such as the ceiling, rather than the trolley, if desired.

FIG. 8 illustrates a bag which is particularly suitable for use in the embodiments of the system shown in FIGS. 4 and 7. This bag is fabricated of a plastic mesh material and has generally square top and bottom walls 78, 79, and rectangular side walls 81. The bag can be of any suitable size, and in one present embodiment, it is 8 feet high and 4 feet wide. Loops 82 are formed along the outer edges of the top and bottom walls for receiving a supporting frame (not shown).

An inlet opening 83 is formed in the upper portion of one of the side walls, and an outlet opening 84 is formed in the bottom wall. In the embodiment illustrated, the inlet opening is square, and the outlet opening is circular. A D-ring 86 is attached to the top wall to provide means for lifting the bag. The D-ring is attached by a strap 87 which passes through the ring and is secured to the top wall, with reinforcing layers 88 on opposite sides of the wall beneath the strap.

The bag shown in FIG. 9 is similar to the embodiment of FIG. 8 except the inlet opening is provided with a closure in the form of a flap 89. The lower edge of the flap is connected to the side wall, with a zipper 91 along the other three edges for holding the flap in a closed position after the bag has been filled.

The system illustrated in FIG. 10 has four bins or bags 92 suspended from an overhead track 93 for movement between a filling station and one or more dispensing stations. The filling station includes a machine 16 for making the cushions and an air flow conveyor 24 which delivers the string of cushions from the machine to the bags. In this particular embodiment, the bags are illustrated as being open at the top, with the conveyor delivering the string of cushions to the bags through the open top, and the track is in the form of a continuous loop.

Figure 11:
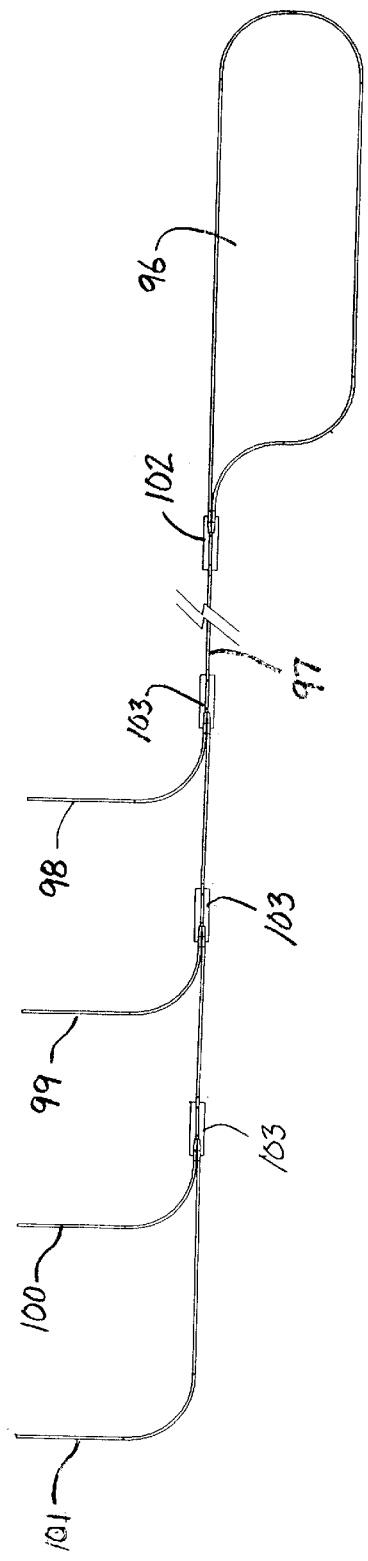

FIG. 11 illustrates a track system which has a loop 96 at one end of a main line 97, with branch lines 98–101 extending from the main line. The loop is connected to the main line by a switching section 102, and branch lines 98–100 are connected to the main line by switching sections 103. The switches allow a bag to be directed into or out of the loop in either direction, and to be directed to or from any of the branch lines.

Figure 12:
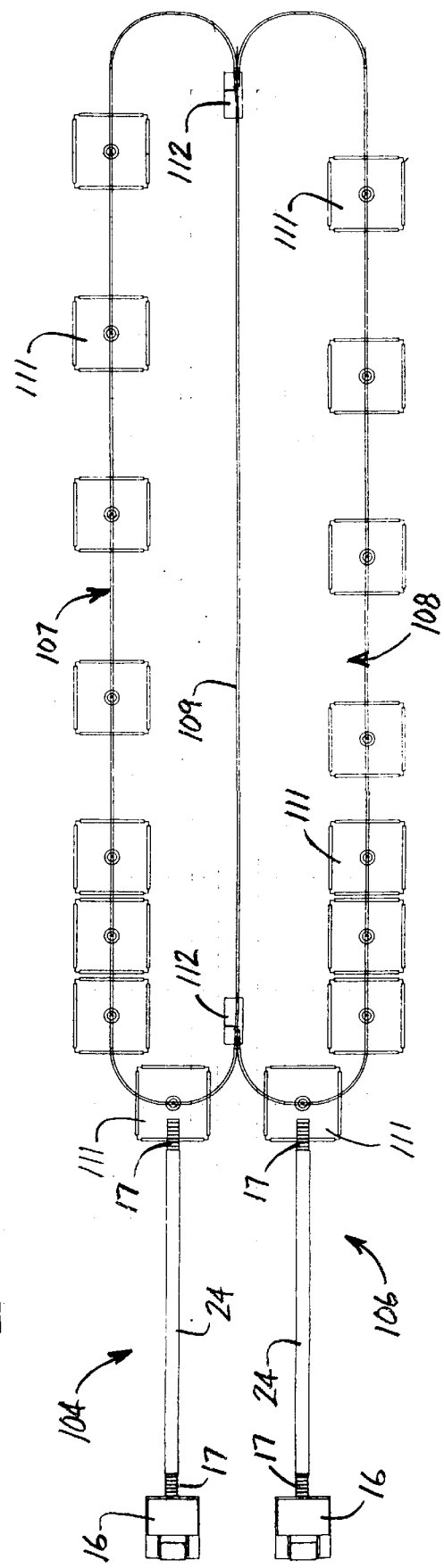

FIG. 12 illustrates a double loop system with two filling stations 104, 106 and two loops of track 107, 108 connected back-to-back in a Figure-8 configuration, with a common rail 109 shared by the two loops. A plurality of bins or bags 111 are suspended from trolleys which roll on the track, and switch sections 112 at the ends of the common rail permit the bags to travel between the common rail and the loops as desired. As in the other embodiments, each of the filling stations includes a cushion making machine 16 and an air flow conveyor 24.

Figure 13:
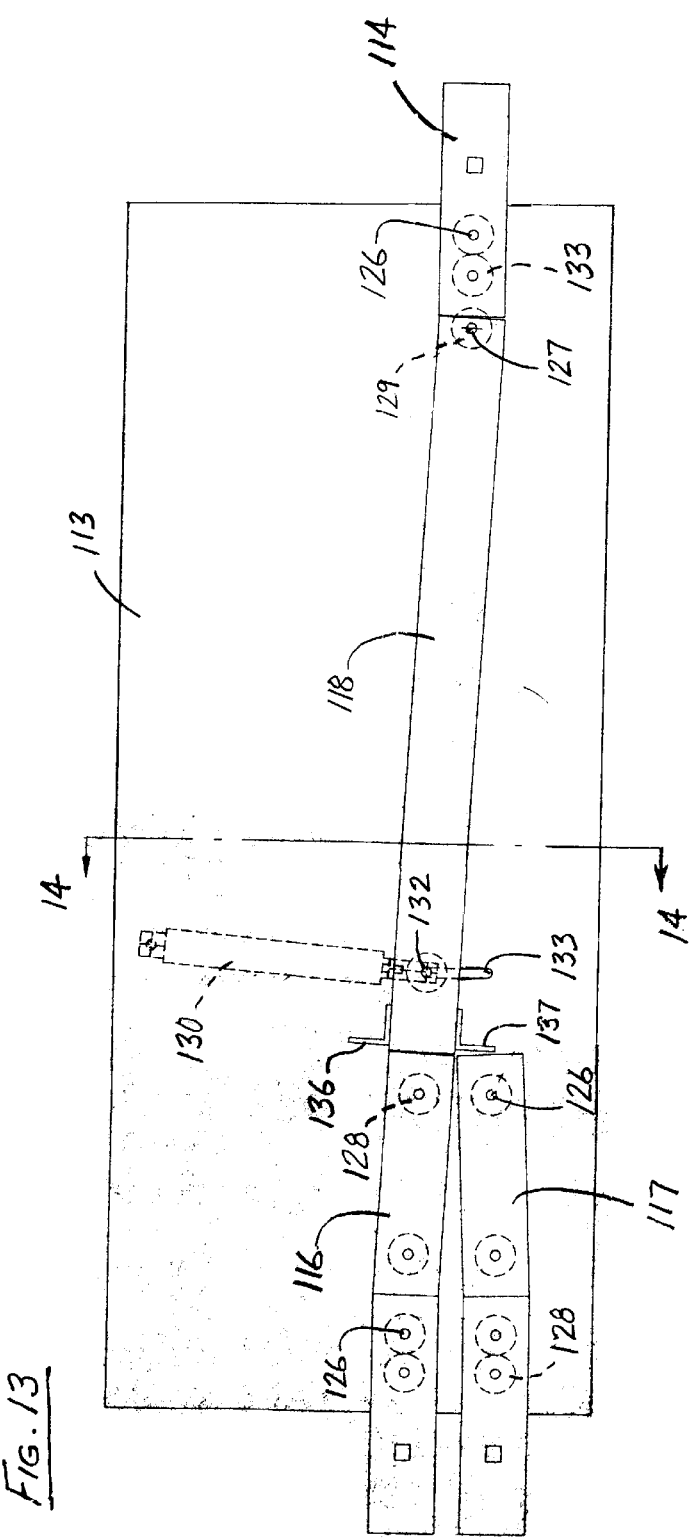
FIG. 13 is a bottom plan view of one embodiment of a switching tracking section for use in the embodiments of FIGS. 11 and 12.
Figure 14:
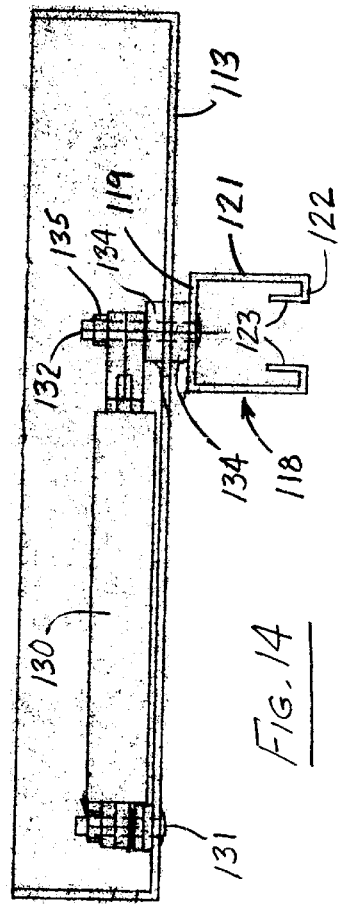
FIG. 14 is a cross-sectional view taken along line 14—14 of FIG. 13, and rotated to an upright position.

FIGS. 13 and 14 illustrate a preferred embodiment of switching section for use in overhead tracks systems such as the embodiments of FIGS. 11 and 12. This section includes a generally rectangular base 113, with an inlet rail 114 and outlet rails 116, 117 mounted in fixed positions toward opposite ends of the base. A movable rail 118 is pivotally mounted on the base for selective alignment between the inlet rail and the two outlet rails. The rails are mounted on the under side of the base and have a downwardly facing, U-shaped cross-sectional configuration, with a horizontally extending web 119 and depending side flanges 121. Flanges 122 extend inwardly from the lower edges of the side flanges, and inner flanges 123 extend upwardly from the inner edges of the lower flanges. The wheels of the trolleys (not shown) ride on the upper edges of flanges 123.

The fixed rails are secured to the base by cap screws 126, and movable rail 118 is pivotally mounted on a cap screw 127 adjacent to the inner end of inlet rail 114. Thus, one end the rail remains aligned with the inlet rail while the other end moves back and forth between the two outlet rails. The rails are spaced from the base by spacers 128 on the cap screws.

A Teflon washer 129 mounted on cap screw 127 and portioned between the base and the rail serves both as a spacer for that rail and as a bearing for the pivot.

A pneumatic operating cylinder 130 is connected between the base and the movable rail for moving the free end of the rail between the two outlet rails. The cylinder is mounted on the upper side of the base, and the body of the cylinder is connected to the base by a cap screw 131. The arm of the cylinder is connected to the movable rail by a cap screw 132 which extends through an arcuate slot 133 in the base, with Teflon washers 134 on opposite sides of the base serving as spacers and providing a bearing surface for the free end of the rail. Locking nuts 135 are used on all of the screws in the switch section.

Flanges 136,137 extend laterally from movable rail 118 at the free end of the rail and serve as stop blocks which prevent the trolleys from running off the end of the outlet rail with which the movable rail is not aligned. Thus, when rail 118 is aligned with rail 116, flange 137 is aligned with rail 117, and when rail 118 is aligned with rail 117, flange 136 is aligned with rail 116.

The invention has a number of important features and advantages. It provides an effective, reliable way of conveying air-filled packing cushions between different locations such as a station where they are made and a station where they are used. It also permits the cushions to be delivered to bins in which they can be stored until they are needed, then readily transported to the points of use. The use of an air flow to convey the cushions avoids the need for contact with mechanical devices which might damage the cushions.

It is apparent from the foregoing that a new and improved system and method for conveying air-filled packing cushions has been provided. While only certain presently preferred embodiments have been described in detail, as will be apparent to those familiar with the art, certain changes and modifications can be made without departing from the scope of the invention as defined by the following claims.

What is claimed is:

1. In a system for conveying an elongated string of air-filled packing cushions which balloon outwardly between transverse seal lines: an elongated duct having inlet and outlet ends, means for feeding a continuous string of the air-filled cushions into the duct at the inlet end with the string extending longitudinally of the duct and the seal lines extending transversely, and means for establishing an air flow in the duct for propelling the string of cushions through the duct in a forward direction toward the outlet end.

2. The system of claim 1 wherein the means for feeding the string of cushions into the duct comprises a machine for making the string of cushions.

3. The system of claim 1 wherein the means for establishing an air flow in the duct comprises an elongated plenum chamber on one side of the duct, means for establishing an air pressure within the plenum chamber which is greater than the air pressure within the duct, and a plurality of directional openings through which air flows into the duct from the plenum chamber.

4. The system of claim 1 wherein the duct is upwardly inclined at an angle on the order of 30 degrees.

5. The system of claim 1 wherein the duct comprises a first section which extends vertically, and a second section which is upwardly inclined at an angle on the order of 30 degrees.

6. The system of claim 5 wherein air is introduced into the duct on the upper side of the string of cushions in the second section.

7. In a system for conveying an elongated string of air-filled packing cushions: an elongated duct having inlet and outlet ends, means for feeding a continuous string of the air-filled cushions into the duct at the inlet end with the string extending longitudinally of the duct, means for establishing an air flow in the duct for propelling the string of cushions through the duct in a forward direction toward the outlet end, and a bin positioned for receiving the string of cushions as it emerges from the outlet end of the duct.

8. The system of claim 7 wherein the bin has wheels which facilitate movement from one location to another.

9. The system of claim 7 wherein the bin is suspended from a trolley which runs on an overhead track that extends between a station where the string of cushions is made and a packing station in which the cushions are used.

10. In a system for conveying an elongated string of air-filled packing cushions: an elongated duct having inlet and outlet ends, means for feeding a continuous string of the air-filled cushions into the duct at the inlet end with the string extending longitudinally of the duct, means for establishing an air flow in the duct for propelling the string of cushions through the duct in a forward direction toward the outlet end, an overhead track which includes a switching section which has an inlet rail, two outlet rails, and a movable rail which is selectively alignable between the inlet rail and the two outlet rails, a trolley which runs on the overhead track, and a bin suspended from the trolley for receiving the string of cushions as it emerges from the outlet end of the duct.

11. The system of claim 10 including stop blocks which project laterally from the movable rail for alignment with the outlet rail with which the movable rail is not aligned to prevent the trolley from running off that rail.

12. In a method of conveying an elongated string of air-filled packing cushions which balloon outwardly between transverse seal lines, the steps of: feeding a continuous string of the air-filled cushions into a first end of an elongated duct with the string extending longitudinally of the duct and the seal lines extending transversely, and establishing an air flow in the duct to convey the string of cushions through the duct in a forward direction toward a second end.

13. The method of claim 12 wherein the air flow is established in the duct by establishing an air pressure in a plenum chamber on one side of the duct which is greater than the air pressure within the duct, and admitting air into the duct from the plenum chamber through a plurality of directional openings between the chamber and the duct.

14. The method of claim 12 further including the step of discharging the string of cushions from the second end of the duct into a bin.

15. The method of claim 12 further including the steps of discharging the string of cushions from the second end of the duct into a bin which is suspended from a trolley on an overhead track, and moving the trolley along the track to a packing station.

16. In a system for providing air-filled packing cushions: a machine for sealing two elongated layers of flexible material together along transverse lines with air in chambers between the lines to form a continuous string of air-filled packing cushions, an elongated duct positioned for receiving the string of cushions from the machine with the string extending longitudinally of the duct and the seal lines extending transversely, means for establishing an air flow in the duct for conveying the string of cushions through the duct, and a bin for receiving the string of cushions from the duct.

17. The system of claim 16 wherein the means for establishing an air flow in the duct comprises an elongated plenum chamber on one side of the duct, means for establishing an air pressure within the plenum chamber which is greater than the air pressure within the duct, and a plurality of directional openings through which air flows into the duct from the plenum chamber.

18. The system of claim 17 wherein the duct comprises a vertical section, a horizontal section, and an inclined section between the vertical section and the horizontal section, the plenum chamber being positioned to one side of the vertical section and above the inclined section and the horizontal section so that the air blows down onto the string of cushions in the inclined section and in the horizontal section.

19. The system of claim 16 wherein the bin is suspended from a trolley which runs on an overhead track that extends between the machine and a packing station where the cushions are used.

20. In a system for providing air-filled packing cushions: a machine for sealing two elongated layers of flexible material together along transverse lines with air in chambers between the lines to form a continuous string of air-filled packing cushions, an elongated duct positioned for receiving the string of cushions from the machine with the string extending longitudinally of the duct and the seal lines extending transversely, means for establishing an air flow in the duct for conveying the string of cushions through the duct, an overhead track which includes a switching section which has an inlet rail, two outlet rails, and a movable rail which is selectively alignable between the inlet rail and the two outlet rails, a trolley which runs on the track, and a bin suspended from the trolley for receiving the string of cushions from the duct.

21. The system of claim 20 including stop blocks which project laterally from the movable rail for alignment with the outlet rail with which the movable rail is not aligned to prevent the trolley from running off that rail.

22. In a method of providing air-filled packing cushions: sealing two elongated layers of flexible material together along transverse lines with air in chambers between the lines to form a continuous string of air-filled packing cushions, feeding the string of cushions into an elongated duct with the string extending longitudinally of the duct and the seal lines extending transversely, establishing an air flow in the duct for conveying the string of cushions through the duct, and discharging the string of cushions from the duct into a bin.

23. The method of claim 22 wherein the air flow is established in the duct by establishing an air pressure in a plenum chamber on one side of the duct which is greater than the air pressure within the duct, and admitting air into the duct from the plenum chamber through a plurality of directional openings between the chamber and the duct.

24. The method of claim 23 including the step of moving the bin along an overhead track from a station where the string of cushions is made to a packing station where the cushions are used.

\* \* \* \* \*